O. GRAETZER AND O. F. BRUMAN.
ELECTRIC WATER HEATER.
APPLICATION FILED AUG. 31, 1921.

1,431,580.  Patented Oct. 10, 1922.

INVENTORS.
Otto Graetzer, and
Otto F. Bruman.
BY
W. B. Hutchinson,
ATTORNEY

Patented Oct. 10, 1922.

1,431,580

UNITED STATES PATENT OFFICE.

OTTO GRAETZER, OF ZOLLIKON, NEAR ZURICH, AND OTTO F. BRUMAN, OF ZURICH-ENGE, SWITZERLAND, ASSIGNORS TO FESTA A. G., OF ZURICH, SWITZERLAND, A CORPORATION OF SWITZERLAND.

ELECTRIC WATER HEATER.

Application filed August 31, 1921. Serial No. 497,128.

*To all whom it may concern:*

Be it known that we, OTTO GRAETZER, a citizen of the German Republic, and a resident of Zollikon, near Zurich, Switzerland, and OTTO F. BRUMAN, a citizen of the Swiss Republic, and a resident of Zürich-Enge, Switzerland, have invented a new and useful Improvement in Electric Water Heaters, of which the following is a full, clear, and exact description.

Our invention relates to improvements in water heating faucets, and more particularly to that class of water heating faucets in which flowing water is heated by electrodes, and whereby the liquid itself acts as electric resistance, and is thereby further heated. The invention also especially relates to an arrangement for the electrical heating of flowing water by means of an electric current in three wire (three phase) distribution. In our application for Letters Patent of the United States No. 423,913, filed November 13th, 1920, an arrangement is shown in which the current flows through two conductors either as continuous current, or as alternating current, and in our application for Letters Patent of the United States No. 445,432, filed February 16th, 1921, there is described a device to heat flowing water electrically by a current which flows through three conductors, either as continuous current or alternating current, or in the form of three phase current. Between these two inventions above referred to, there are many possible combinations which improve the construction and effect of the device, and the present invention relates to these improvements. These will be understood better from the description which follows.

Reference is to be had to the accompanying drawings forming a part of this specification, in which similar reference characters indicate corresponding parts in all the views.

Figures 5 and 6 are cross sectional plan diagrams of the development of the invention as based on the application No. 445,432 above referred to.

Figures 7, 8, 9:
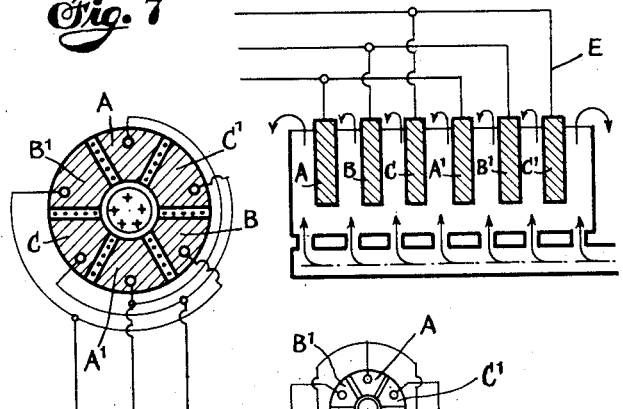
Figure 7A:
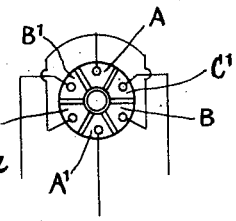

Figures 7 and 7ª are diagrammatic plans showing a number of electrodes in excess of the number of conductors.

Figure 8 is a diagrammatic section showing the arrangement in the form of a plane, and Figure 9 is a diagrammatic plan showing the electrodes in excess of the number of connections and adapted for a three phase current.

The drawings are by way of example, and the structural details can be changed and added to without affecting the invention.

Figure 1:
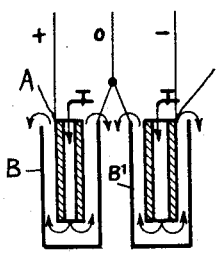
Figure 1 is a diagrammatic sectional view of a pair of heating elements connected up in accordance with our invention.

As shown in Figure 1, the outer electrodes B and B¹ are connected to each other and with the zero conductor of a three wire distribution, while the inner electrode A is connected to the positive conductor, and the corresponding electrodes A¹ is connected to the minus conductor. The current therefore flows from the positive conductor, through the electrode A and through the liquid to the electrode B, and from there through the zero conductor to the electrode B¹, thence through the liquid to the electrode A¹, and from there to the negative conductor. By this arrangement the tension is divided in two, since two equal resistances are formed whereby each element A, B and A¹, B¹ takes up half of the energy. Thus the device is doubling the arrangement according to the application No. 423,913 above referred to.

Figure 2:
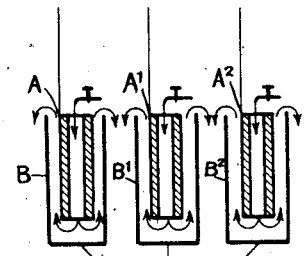
Figure 2 shows a corresponding arrangement for a three phase current.

The corresponding arrangement for three phase current is shown in Figure 2. The current enters through the electrodes A, A¹, A², and flows through the liquid, and over the electrodes B, B¹, B² to the zero point C, in the manner shown in the drawing. This arrangement corresponds to the star connection usually encountered, and consists simply in the grouping of three equal elements accordingg to the application No. 423,913.

Figure 3:
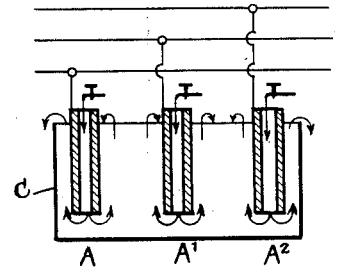
Figure 3 is a diagrammatic elevation in which the three electrodes are contained in a common vessel, which may represent the zero conductor.

In Figure 3 the same result is obtained by arranging the three electrodes A, A¹, A² in a common vessel, whereby the liquid flows downward through the hollow electrodes, and rises again between the electrodes A, A¹, A² and A³, thence flowing over the edge of the vessel C. The latter thereby represents the zero point. In case the vessel C is considered as non-conducting, this arrangement represents the delta connection for three phase current.

Figure 4:
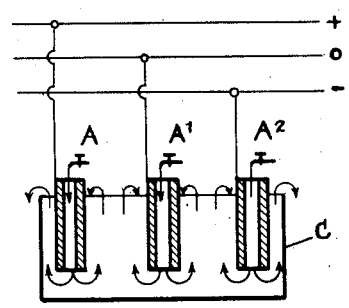
Figure 4 is a view similar to Figure 3, but in which the containing vessel may or may not be a conductor.

Figure 4 represents the same general idea, but for three wire distribution, either direct current or alternating current, whereby it is immaterial whether the vessel C over whose edge the water is flowing downward, is an electric conductor or not. The middle electrode A¹ is thereby connected to the zero conductor, the outer electrode A with the positive conductor, and the electrode A² with the negative conductor. The current flows in the same manner as described with reference to Figure 1.

Figure 5:
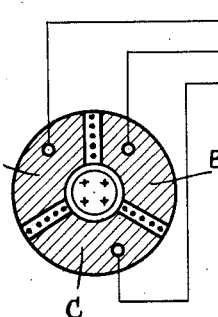
Figure 6:
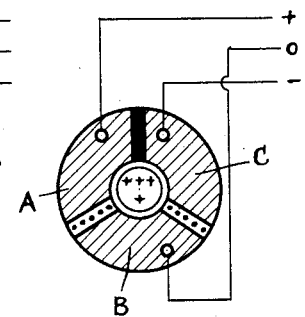

Another arrangement for the transformation of the electric current into heat is shown in Figures 5 and 6, which is a development of the arrangement shown in our application No. 445,432. A further development of this arrangement is shown in Figures 7—7ª, 8 and 9, whereby the number of electrodes is greater than the number of conductors. In Figure 7, for instance six electrodes are shown arranged equally spaced around a central tube, these electrodes being connected diametrically. The liquid to be heated rises through the gaps between the electrodes after having flown downward through the central tube. In this manner the current intake is nearly four times larger than where three electrodes are used. Special attention is called to the fact that there is no neutral point in this connection, which therefore is to be called a multiple delta connection. In connecting the segments which are situated at 120° from each other, we obtain a star connection. The neutral point may then be connected to the earth or not. (See Figure 7ª.)

Figure 8 shows the same idea in which the arrangement is developed in plane form. The liquid flows through the lower pipe and corresponding gaps between the electrodes, and after rising, flows over the edge of the vessel, which may be conducting or non-conducting.

The corresponding scheme for three wire distribution is shown in Figure 9, where four segments are illustrated. The current enters through the electrode A, then it subdivides itself to the electrodes B which are connected to each other and to the zero conductor, thence it flows over the electrode C to the negative conductor. The current therefore has to pass through two layers of liquid at the same time, and two layers of liquid consecutively, whereby the current intake is doubled.

The arrangement according to Figures 7—7ª, 8 and 9 have the special advantage that the current intake is much larger for a given cooling surface. Such apparatus in a very compact arrangement, gives the greatest amount of heat with the least loss of current. They are particularly adapted for the production of flowing hot water. Since large quantities of hot water necessarily require large electrical energies, and the latter can only be obtained in the form of three phase alternating current, or alternating current and continuous current in three wire distribution, the above mentioned invention complies with the long known want of apparatus to efficiently produce hot water.

We claim:

1. An apparatus for electrically heating flowing water by means of electrodes and in which the liquid acts as electrical resistance and is thoroughly heated, characterized by a plurality of spaced electrodes between which the water passes, and a three phase connection for said electrodes.

2. An electric water heater having a plurality of elements each consisting of a plurality of electrodes between which flows the water to be heated, and three wire current distribution suitably connected to the electrodes.

3. An electric water heater of the kind in which the water to be heated passes in thin strata between electrodes, characterized by a plurality of spaced electrodes in greater number than the conductors therefor, between which electrodes the water passes, and electrical connections for the electrodes.

OTTO GRAETZER,
OTTO F. BRUMAN.

Witness:
CHR. MILLIER.